(12) United States Patent
Begeja et al.

(10) Patent No.: US 8,752,087 B2
(45) Date of Patent: Jun. 10, 2014

(54) SYSTEM AND METHOD FOR DYNAMICALLY CONSTRUCTING PERSONALIZED CONTEXTUAL VIDEO PROGRAMS

(75) Inventors: Lee Begeja, Gillette, NJ (US); David C. Gibbon, Lincroft, NJ (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 695 days.

(21) Appl. No.: 12/267,284

(22) Filed: Nov. 7, 2008

(65) Prior Publication Data
US 2010/0122286 A1 May 13, 2010

(51) Int. Cl.
*H04N 7/025* (2006.01)
*G06Q 30/00* (2012.01)

(52) U.S. Cl.
USPC ............................. 725/34; 725/32; 705/14.49

(58) Field of Classification Search
USPC ...................................................... 725/32, 34
See application file for complete search history.

(56) References Cited

U.S. PATENT DOCUMENTS

| | | | |
|---|---|---|---|
| 6,177,931 B1 | 1/2001 | Alexander et al. | |
| 6,446,261 B1 * | 9/2002 | Rosser | 725/34 |
| 6,698,020 B1 | 2/2004 | Zigmond et al. | |
| 7,231,651 B2 * | 6/2007 | Pong | 725/32 |
| 7,631,330 B1 * | 12/2009 | Des Jardins | 725/44 |
| 7,650,617 B2 | 1/2010 | Hoshino et al. | |
| 7,720,432 B1 | 5/2010 | Colby et al. | |
| 7,721,307 B2 * | 5/2010 | Hendricks et al. | 725/34 |
| 2002/0062481 A1 | 5/2002 | Slaney et al. | |
| 2002/0066026 A1 | 5/2002 | Yau et al. | |
| 2002/0116313 A1 | 8/2002 | Detering | |
| 2003/0061206 A1 | 3/2003 | Qian | |
| 2003/0177490 A1 | 9/2003 | Hoshino et al. | |
| 2004/0098753 A1 * | 5/2004 | Reynolds et al. | 725/135 |
| 2004/0194128 A1 | 9/2004 | McIntyre et al. | |
| 2004/0261096 A1 | 12/2004 | Matz | |
| 2006/0085815 A1 * | 4/2006 | Nguyen-Tran | 725/34 |
| 2007/0061838 A1 * | 3/2007 | Grubbs et al. | 725/35 |
| 2007/0157228 A1 | 7/2007 | Bayer et al. | |
| 2007/0226761 A1 * | 9/2007 | Zalewski et al. | 725/32 |
| 2008/0127252 A1 * | 5/2008 | Eldering et al. | 725/34 |
| 2009/0310932 A1 | 12/2009 | Hsieh et al. | |
| 2010/0036718 A1 * | 2/2010 | Hamilton et al. | 705/14.4 |
| 2010/0058381 A1 | 3/2010 | Begeja et al. | |
| 2010/0122285 A1 | 5/2010 | Begeja et al. | |
| 2010/0242063 A1 | 9/2010 | Slaney et al. | |
| 2010/0275221 A1 | 10/2010 | DuVall et al. | |

\* cited by examiner

*Primary Examiner* — Chris Parry

(57) ABSTRACT

Systems, methods, and computer readable-media for dynamically constructing personalized contextual video programs include extracting video metadata from a video program, extracting component metadata from video components stored in a media object library, extracting viewer preferences, receiving synchronization information about the video program, identifying a video program segment susceptible to inserting a video component, and transmitting the video component to a playback device and instructions detailing how to insert the video component in the video program segment. Video metadata can be extracted in real time. A viewer profile can be based on demographic information and user behavior. The video program and the video component can be combined before transmitting the video component and instructions to the playback device. A video component can be selected based on which advertiser offers to pay the most. The transmitted video component and instructions can be stored as a construction list for future use.

18 Claims, 7 Drawing Sheets

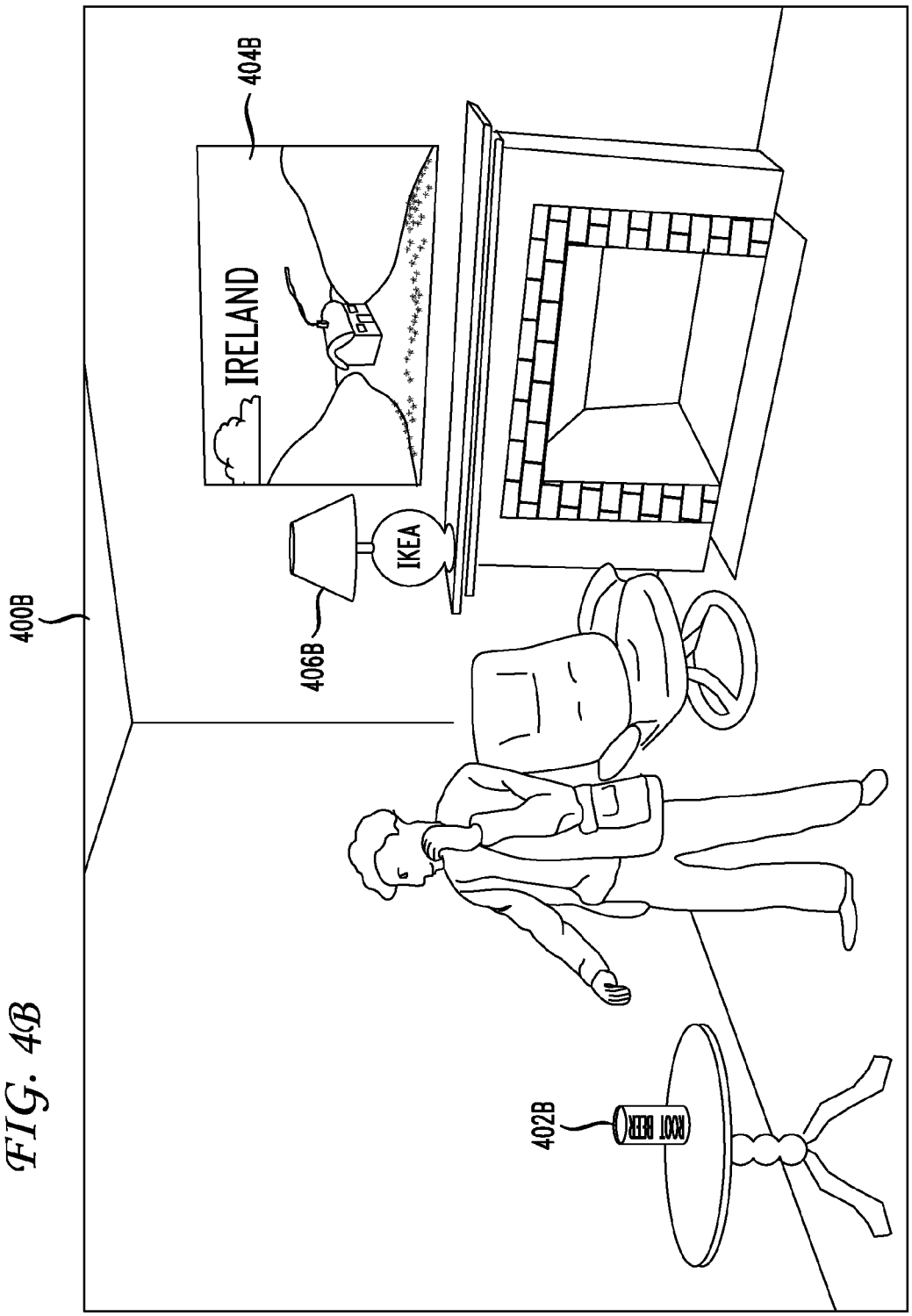

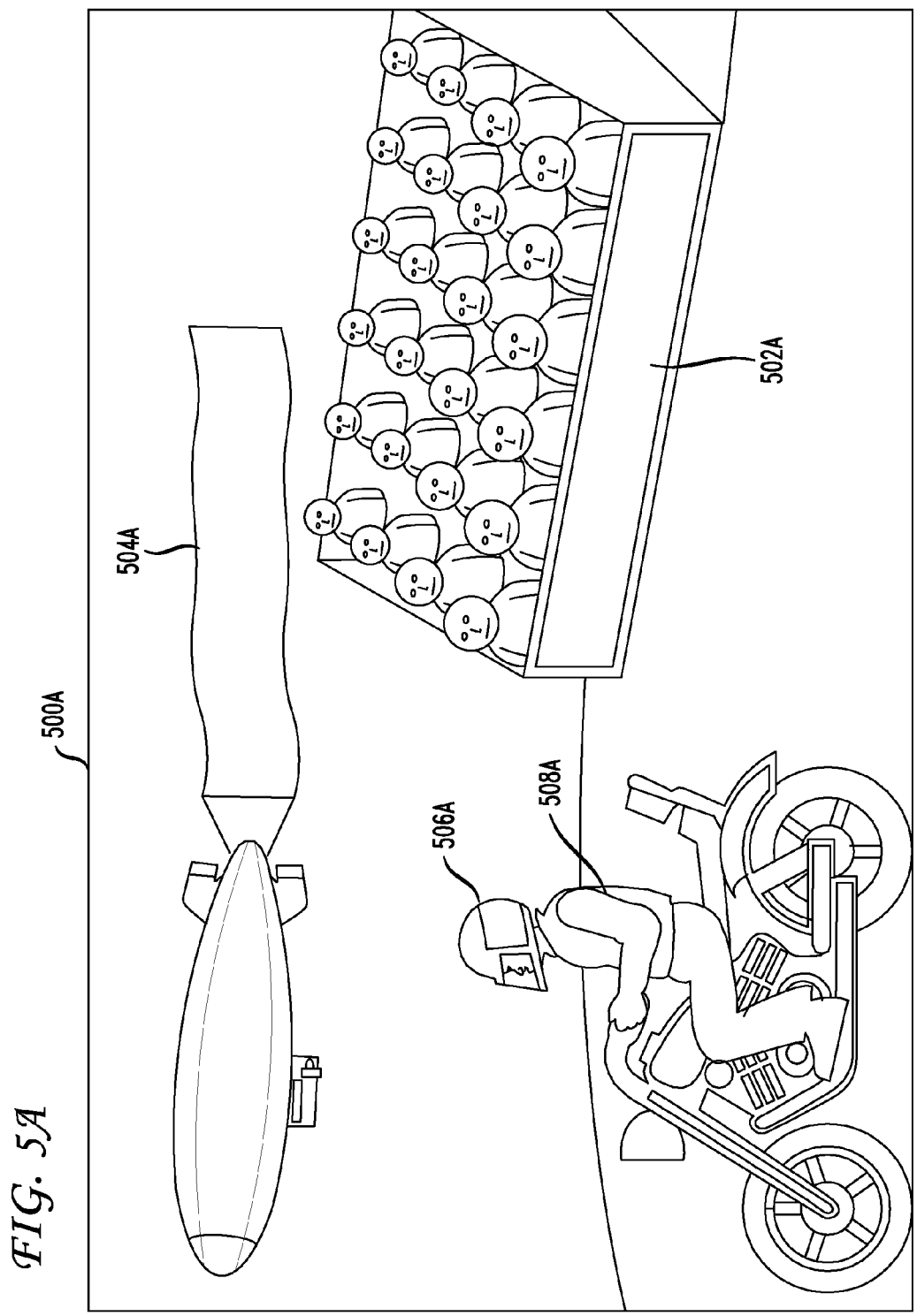

SYSTEM AND METHOD FOR DYNAMICALLY CONSTRUCTING PERSONALIZED CONTEXTUAL VIDEO PROGRAMS

CROSS-REFERENCE TO RELATED APPLICATION

This application relates to application Ser. No. 12/204,265 titled "Methods and Apparatus for Dynamic Construction of Personalized Content" filed Sep. 4, 2008, titled "System and Method for Dynamically Constructing Audio in a Personalized Contextual Video Program" filed Nov. 7, 2008. The contents of these applications are herein incorporated by reference.

BACKGROUND OF THE INVENTION

1. Field of the Invention

The present invention relates to video processing and more specifically to dynamic personalized contextual video programs.

2. Introduction

For decades television networks have divided television content along clearly marked boundaries: advertisements and television shows. Television networks broadcast a show interrupted by series of advertisements. Typically these advertisements follow strict time constraints of 15, 30, or 60 seconds, but some variations have been and are currently used. In the past, soap operas incorporated advertisements into the show by having actors sing or speak advertising text during the usual program. Infomercials appear to be a television show, but are really a show-length, paid advertisement disguised as a television show. While some variations are used and have been experimented with in the past, the time-tested pattern of "show, ad break, show, ad break" is followed by nearly every television channel in some form or another.

With the advent of digital video recorders (DVR) such as TiVo, television viewers are able to record, timeshift, pause live television, fast forward, and, most importantly, easily skip traditional advertisements in recorded television. While these abilities are heralded as a great boon by television viewers, advertisers are less optimistic because viewers can skip advertisements at will. With fewer viewers, advertisements are less effective, which causes problems for advertisers. With less effective advertisements and fewer viewers, television networks cannot charge advertisers as much for commercial air time.

To respond to the problem of skipping advertisements, advertisers and television networks are turning to more embedded approaches in addition to traditional advertisements. For example, television networks promote other television shows in graphics and videos superimposed over a portion of the screen, like a scrolling station identifier, a picture of Homer Simpson's head, and text saying "Simpsons are coming up next at 7:30, only on FOX 21." Such advertisements are typically relegated to a corner or edge of the screen and are usually unrelated to the primary television show. These sorts of advertisements and promotional information are commonplace now and are difficult or impossible to remove from the viewer's sight by means of a DVR. However viewers are increasingly desensitized to these unrelated, superimposed video objects and pay less and less attention to them. Further, these video objects are frequently annoying, disrupt the show, and can obscure important parts of the screen. These overlaid advertisements are broadcast to each viewer and are not tailored to the interests and demographic of each viewer. Advertisers and television networks are constantly searching for new ways to advertise so that viewers pay attention and respond to advertising.

Additionally, these known approaches to advertising are not personalized or targeted to each viewer. Advertising in this untargeted way is inefficient. Accordingly, what is needed in the art is an improved way to blend targeted advertisements with video content so that it is difficult for consumers to ignore or tune out the advertisements.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable-media for dynamically constructing personalized contextual advertisements. The method includes extracting video metadata from a video program displayed on a playback device to a viewer, extracting component metadata from a plurality of video components stored in a media object library, extracting viewer preferences from a viewer profile, receiving synchronization information about the video program, identifying a segment of the video program susceptible to inserting a video component, based on extracted video metadata, component metadata, and viewer preferences, and transmitting the video component to the playback device and a set of instructions detailing how to insert the video component in real time in the segment of the video program. Video components can be one or more of a two-dimensional image, a video clip, a logo, a vector illustration, a three-dimensional model, a color, a character, a texture, and text. Video metadata can be extracted in real time. A viewer profile can be based on demographic information and a log of user behavior. The video program and the video component can be combined before transmitting the video component and the set of instructions to the playback device. A video component can be selected based on which advertiser offers to pay the most. The transmitted video component and set of instructions can be stored as a construction list for future use.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4B illustrates the same television scene modified with personalized contextual advertisements;

FIG. 5A illustrates a second unmodified video game prepared for use with dynamically constructed personalized contextual advertisements.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
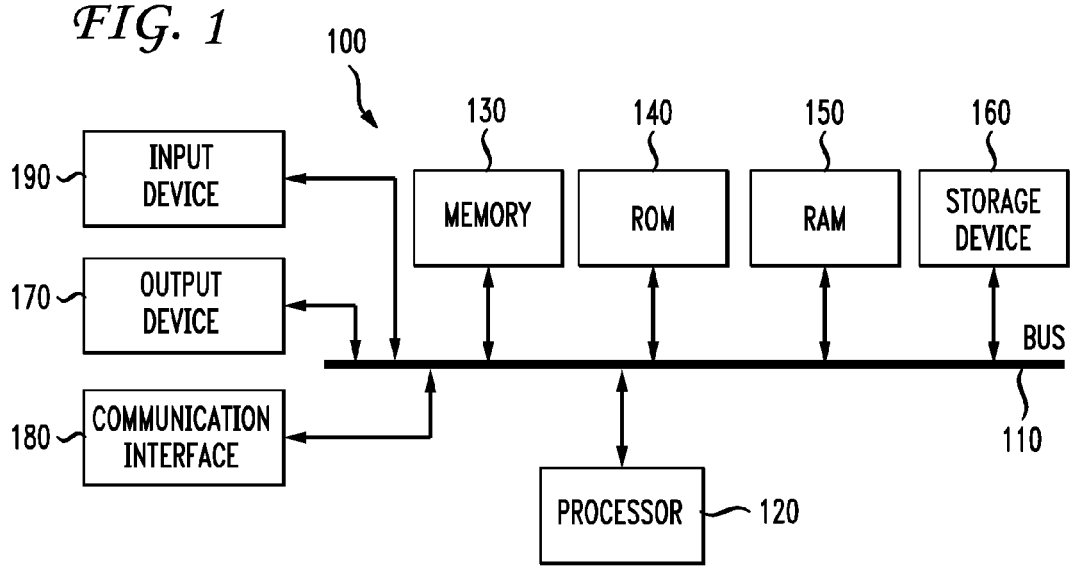
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

With these basic principles in mind, the disclosure turns to the method embodiment. The method embodiment is discussed in terms of a system which performs the steps of the method. The system may be a portable device, a server, a desktop computer, a video game console, etc. Although the principles described herein may be applied successfully to advertising content and many of the examples given relate to advertisements, the invention is not limited to inserting advertising content and may be extended to construct any personalized contextual video.

Figure 2:
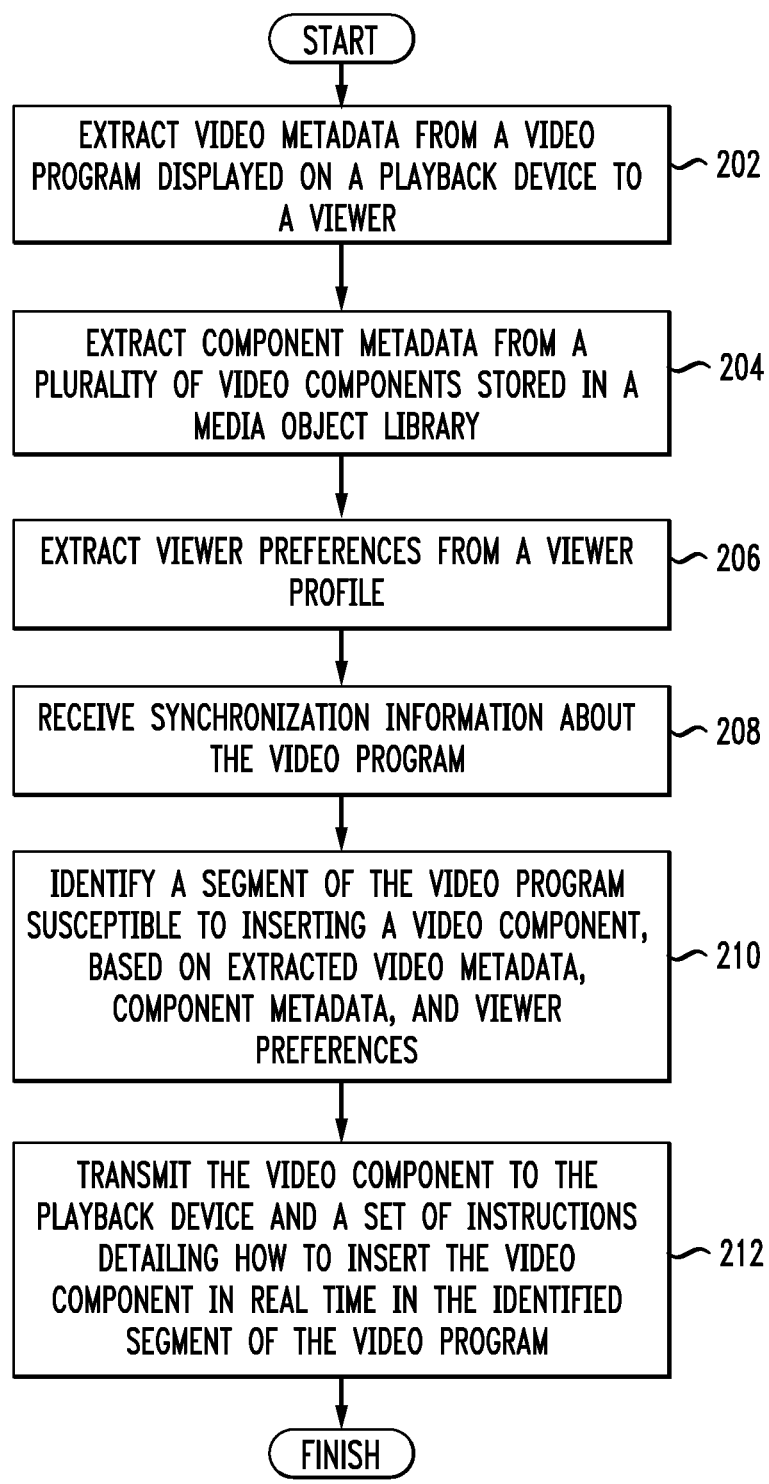
FIG. 2 illustrates an example method embodiment.

One of the objectives of the method is to blur the line between ads and video content by dynamically merging contextual, personalized advertising into the video itself rather than playing advertising alongside a video, during designated commercial breaks, or overlaying an unrelated advertisement over a fixed portion of the screen. FIG. 2 illustrates an example method embodiment. The system extracts video metadata from a video program displayed on a playback device to a viewer (202). The system can process video metadata in advance and store it either in the video program itself or in a separate file. The system can extract video metadata from the video in real time by processing the video and analyzing the video contents during playback. As video processing technology develops, the system can initiate video metadata analysis when playback is started and can finish the analysis before the end of the video, essentially extracting metadata faster than playback. In this variation, the system caches video metadata until it is needed. Video metadata is a very expansive term that includes textual information such as closed captions, phone numbers, embedded URLs, commercial break locations, background information such as a plot summary, location information, the era of the film, actors present in a specific scene, angles, specific objects in the film, which demographic groups the video may appeal to, and generally any information about the content of the video. The system can extract video metadata from sources external to the video itself, such as reviews from rottentomatoes.com or director and producer information from imdb.com. Video metadata is the first source of data out of three which inform personalized dynamic contextual video programs.

The system then extracts component metadata from a plurality of video components stored in a media object library (204). Video components include two-dimensional images, audio clips, video clips, logos, vector illustrations, three-dimensional models, colors, characters, textures, shapes, cartoon characters, faces, text, etc. Video components may be parts of advertisements. Advertising components are any subpart of advertising. For example, a Coca-Cola® video advertisement can be broken down into sub-parts such as the Coca-Cola® logo, the website mycokerewards.com, the color red, a photo of an icy bottle of Coca-Cola®, the distinctive shape of the bottle, a sound bite, etc. The system can store a media object library centrally or distributed across several locations. Advertisers can synthetically generate advertising components, record them from video clips or animated cartoons, etc. Advertising components are essentially the ingredients used in making advertisements. Advertisers can provide these components to the system for use in dynamic personalized contextual advertisements. For example, Energizer Holdings can provide a synthetically generated 3D model of a battery with different shading, coloring, etc., a 3D model of the Energizer Bunny®, a video clip of the bunny beating his drum at various resolutions, a computer animation of a battery, an audio clip of Energizer's® jingle, an image of the Energizer® logo, a vector illustration of the same logo, the face of the Energizer® spokesman, etc. The system associates each advertising component with metadata describing the component, how it is to be used, which advertiser to use it with, billing information, placement information, color information, target demographic, etc. Video component metadata is a second source of data to inform personalized dynamic contextual video programs.

Next the system extracts viewer preferences from a viewer profile (206). The contents of a viewer profile can be implicitly created, such as observing what a viewer watches on a regular basis, or explicitly created, such as by a viewer filling out a survey. A viewer profile can contain demographic information and/or a log of user behavior. Viewer preferences can also include a log of which advertisements are equated with purchases to give some kind of indication which advertisements or products are of interest to the viewer. Viewer preferences are a third source of data to inform personalized dynamic contextual video programs.

Next the system receives synchronization information about the video program (208). For example, if a server is communicating with a video playback device, the playback device sends information to the server such as which video is playing, the current playback position, which video metadata apply to the current playback position, etc. The playback device can tell the server the rate of playback (i.e. is the video rewinding or being fast-forwarded and at what speed). If the media is capable of being displayed on different types of devices, synchronization information can include which device and which playback capabilities are available and which are being used. In these cases, the system can incorporate dynamic personalized contextual video components in the unused playback capabilities.

Then the system identifies a segment of the video program susceptible to inserting a video component, based on extracted video metadata, component metadata, and viewer preferences (210). The system can identify a segment of the video program down to the pixel level. However, a segment typically equates to an object within the video program. For example, a television show may depict the protagonist driving in a Mercedes. The entire Mercedes can be a segment that covers multiple frames and changes position, size, and angle over the frames. The system can identify that the Mercedes segment is susceptible to inserting another car, for example, an Acura, Lada, or Chevrolet, in its place. Each of the advertising components which may be inserted into the video in place of the Mercedes can be a candidate, but the system selects the identified advertising component based not only on video metadata indicating that a car is in the scene, but also on ad metadata and viewer preferences. For example, ad metadata indicates that a suitable 3D model of a car only exists for the Chevrolet, so only that car is a candidate for inserting into the video program. Or, for example, viewer preferences may indicate that the viewer is in the market for a car, but only for German cars. In that case, the system selects the Mercedes to insert over the Lada.

Effectively, when the system inserts a component over a segment of the video program, the result is similar to the "green screen" effect in cinema of replacing one object with another, but in a very precise, personalized, dynamic way. Instead of thinking of a television broadcast or DVD as a work that is permanent and fixed, it becomes more malleable and can be altered in numerous ways for different viewers. The principles described herein can be applied to targeted, personalized non-advertising purposes as well. The principles described herein can also be applied to live television broadcasts, IPTV, DVDs, VHS tapes, streamed online video, home videos, video games, portable media players, GPS displays, movie theaters, electronic information kiosks, etc.

Because this technique is likely to be used by television or cable networks, the system can assign higher priority to advertising components of an advertiser who offers or bids more money. This element of the technique as applied to advertising can be called the Z-depth. The system can allow for bids on a wholesale scale to be shown to many millions of viewers or on a more targeted scale where each user receives only ads that are directly relevant to her. A middle ground somewhere between these two extremes or a blend of the two is much more likely in implementation.

Lastly, the system transmits the video component to the playback device and a set of instructions detailing how to insert the video component in real time in the segment of the video program (212). Instructions can include a markup language like Postscript coordinates, VRML, X3D, 3DML, or other common language to describe where and how to place advertising components. In one embodiment, a set top box attaches to a television which receives and processes transmitted advertising components and instructions. The set top box inserts the advertising component into the video and displays it to a user. In another embodiment, a remote server performs the insertion and broadcasts it to a television set over the air or over a cable television network. In the case of streaming video over the Internet, some combination of both can be applied. The system can store transmitted advertising component and sets of instructions as a construction list for future use. When a certain combination is likely to occur over and over, a construction list can recreate it with minimal difficulty. One similar technology is a Display List in the OpenGL programming language.

The system optionally ranks segments by prominence and visibility in the video program and assigns a price to each segment based on the ranking. The price can be a static price or it can be a minimum price if advertisers bid on advertising spots. Many different payment models can be applied to charge advertisers. Advertisers can be charged a flat rate, by the impression, by the viewer, etc. The system can track different segments and determine if they are large, small, completely visible, partially obscured, straight-on, skewed, etc. A prominence and visibility ranking allows for some indication of how effective an inserted advertisement is likely to be. An advertiser should be charged more for a large, unobstructed placement of an advertising component than for a small, skewed, obscured placement. Advertisers can set a threshold using the ranking structure to prefer only higher visibility placements, for example. In order to correctly place advertising components on skewed or obscured video segments, a three dimensional model of the particular scene in the video program and the viewer's position may be required, among other things.

Advertisers can establish guidelines governing the usage and placement of the advertiser's advertising components. For example, Coca Cola may have a policy that their product placements are not to occur alongside their competitors. So the system implements a usage guideline disallowing competitors like Pepsi or RC-Cola from inserting their advertising components with Coca Cola. Disney may establish a guideline that no Disney products are to be advertised alongside "adult" advertisements. Advertisers may establish a usage guideline outlining a legally required obligation, such as a regulation prohibiting tobacco companies from targeting children. A university football team can establish a guideline that their logo only be used with university colors. These and other guidelines regarding usage and placement are possible.

Further, the system optionally receives feedback based on viewer behavior and generates a behavior model for the viewer based on the received feedback. Feedback includes user interaction with the television, remote control, video playback device, etc. Feedback includes purchases of advertised goods or services. Feedback can be based on almost any viewer behavior and/or interaction. The system can represent aggregated behavior information about one viewer in a viewer behavior model. The system can generate viewer behavioral models on a personal level, small group level, or demographic level. The behavior model allows for more targeted advertising that is continuously refined and updated as new behavior patterns emerge. If a viewer responds positively to advertisements accompanied by classical music, then the system can insert advertising components containing or relating to classical music into the video program or combine classical music with existing advertising components.

In one variation, a viewer profile classifies a viewer as an impulsive purchaser, a purchaser who meticulously researches every purchase, or somewhere in between. Based on the classification, the system selects advertising components from the media object library with different levels of advertising detail. The system can categorize, assign, and sort advertising components by level of detail to facilitate this variation. One of skill in the art will recognize many variations involving user feedback and behavior models.

The described method is also applicable to three dimensional environments such as video games or virtual worlds. In addition to replacing existing in-game objects, the system can set aside blank billboards or other advertising space especially for dynamic personalized contextual advertisements. The system can select a personalized, contextual video component for each player or participant individually. The system can be a central server which communicates with each player's computer or the system can be each individual computer. The visibility and prominence of advertising spaces in a dynamic three dimensional environment are subject to change, so the pricing for each spot is subject to change as well. In one variation on personalized, contextual advertising in video games, the system confers a benefit such as discounted pricing, in-game performance boosts, etc. to characters for opting to "wear" advertising material on their virtual character. "Worn" advertising material can appear differently to each player, as it is a personalized, contextual advertisement. For example, the player's virtual character appears on one person's screen wears a Hershey's advertisement and on another person's screen wears a BMW advertisement.

Figure 3:
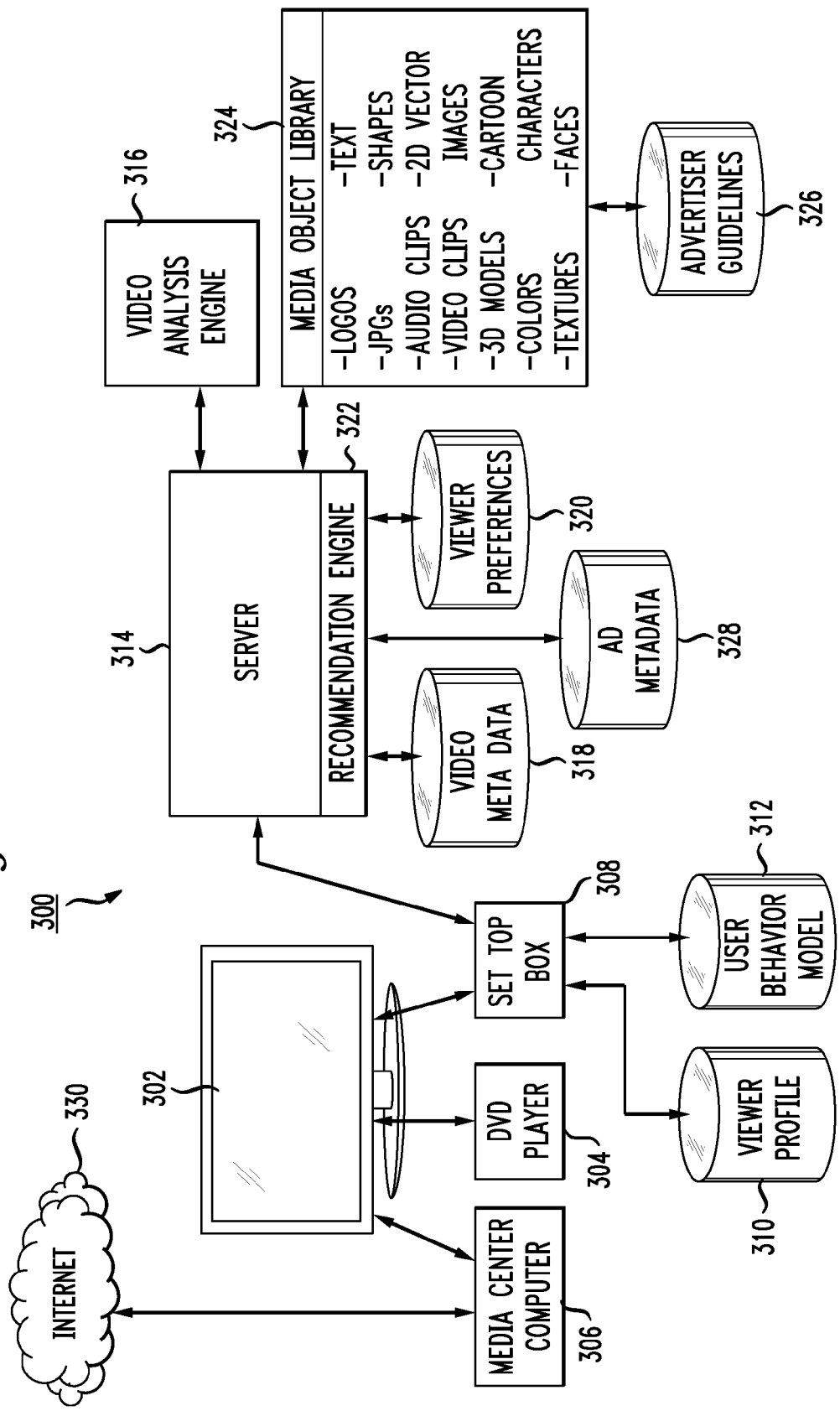
FIG. 3 illustrates a sample system to dynamically construct personalized contextual advertisements.

FIG. 3 illustrates a sample system to dynamically construct personalized contextual advertisements. The system 300 revolves around a display device 302 such as a television, computer monitor, portable media player, smart phone, etc. A television is shown, but virtually any display device can be substituted. The television 302 is connected to multiple input devices such as a DVD player 304, a media center computer 306 connected to the Internet 330, and a set-top box 308. The system can insert dynamic, contextual, personalized advertising material into video playback on any such device. The set-top box 308 can store a viewer profile 310 and a user behavior model 312. In this illustration, only the set-top box 308 is connected to the server 314, but any of the playback devices 304, 306, 308 or the television 302 itself can be connected to the server. The connection can be a cable television network, the Internet, 802.11x, Ethernet, or some combination. The server 314 and other components shown can be wholly or partially integrated into the playback devices or the television.

When the server 314 receives video, it passes the video through a video analysis engine 316 such as the Miracle Video Search Engine from AT&T Labs. The video analysis engine 316 provides video metadata 318 to the server. The video metadata 318 describes the content of the video. The server stores ad metadata 328 describing available advertising components in the media object library 324. Advertisers can provide metadata describing advertising components or the server can analyze and generate ad metadata with minimal advertiser assistance or completely without advertiser assistance. The server 314 also stores viewer preferences 320 which can be based on a usage/interaction log, on a viewer profile 310, and/or on a user behavior model 312.

With these three primary sources of information, the video metadata 318, the ad metadata 328, and the viewer preferences 320, the recommendation engine 322 determines which segments of the video are susceptible to inserting advertising components. The recommendation engine 322 retrieves the appropriate advertising components from the media object library 324, packages them with instructions detailing how to insert them in the video, and sends that package through the server 314 to the set-top box 308. The set-top box then follows the instructions to insert the advertising component into the appropriate video segment. One concrete example of the end result is the server identifies a t-shirt of a character in a television show suitable for placing advertisements, selects an appropriate logo for a product from the media object library 324 based on viewer preferences (perhaps selecting a shoe company logo for a teenage girl or a software company logo for a software engineer), prepares instructions on how to insert the logo on the t-shirt (such as warping, scaling, masking, transparency, positioning, and/or motion adjustments), sends the instructions and the logo, perhaps in SVG or other vector format, to the set-top box 308 which inserts the logo on the shirt. The set-top box can contain individual settings to allow or disallow such instructions or to filter specific types of instructions. The set-top box 308 and server 314 can be aware of which viewers are present and attempt to select advertising components that best coincide with the preferences, interests, and tendencies of all viewers, where possible.

Further, as discussed above, advertisers can establish guidelines 326 to govern how, when, and where advertising components are to be used. Advertiser guidelines can be per advertiser, per advertising component, per product line, etc. Some example advertiser guidelines are "display the Intel logo only in science and technology related segments", "never display the AT&T logo in close proximity with logos of any other telecommunications providers", and "My Little Pony Fruit Snacks advertising components are preferred to be displayed on Saturday morning cartoons". Although advertiser guidelines 326 are shown as connected with the media object library 324, advertiser guidelines can be connected in other places or distributed in several places, such as the server 314 or the set-top box 308. A direct interface, such as through a web page, can be provided for advertisers to log in and change their guidelines. Advertisers can use the same or similar interface to upload advertising components to the media object library 324. Advertisers can also upload complete objects to the library and identify portions of each object to separate out into advertising components. For example, an advertiser uploads a video clip. The advertiser can separate out the video element, the audio element, individual frames, any included closed captions, etc. as separate advertising components. The system can use each component element in different ways. In some cases, the system uses an entire object instead of just the component elements. For example, in a movie which includes a television set in the background, the system can adjust an entire advertising video clip for insertion over the screen of the television set in the background, including audio. The system may reduce the volume of the audio so as not to overpower the sound effects and dialog in the video program.

Figure 4A:
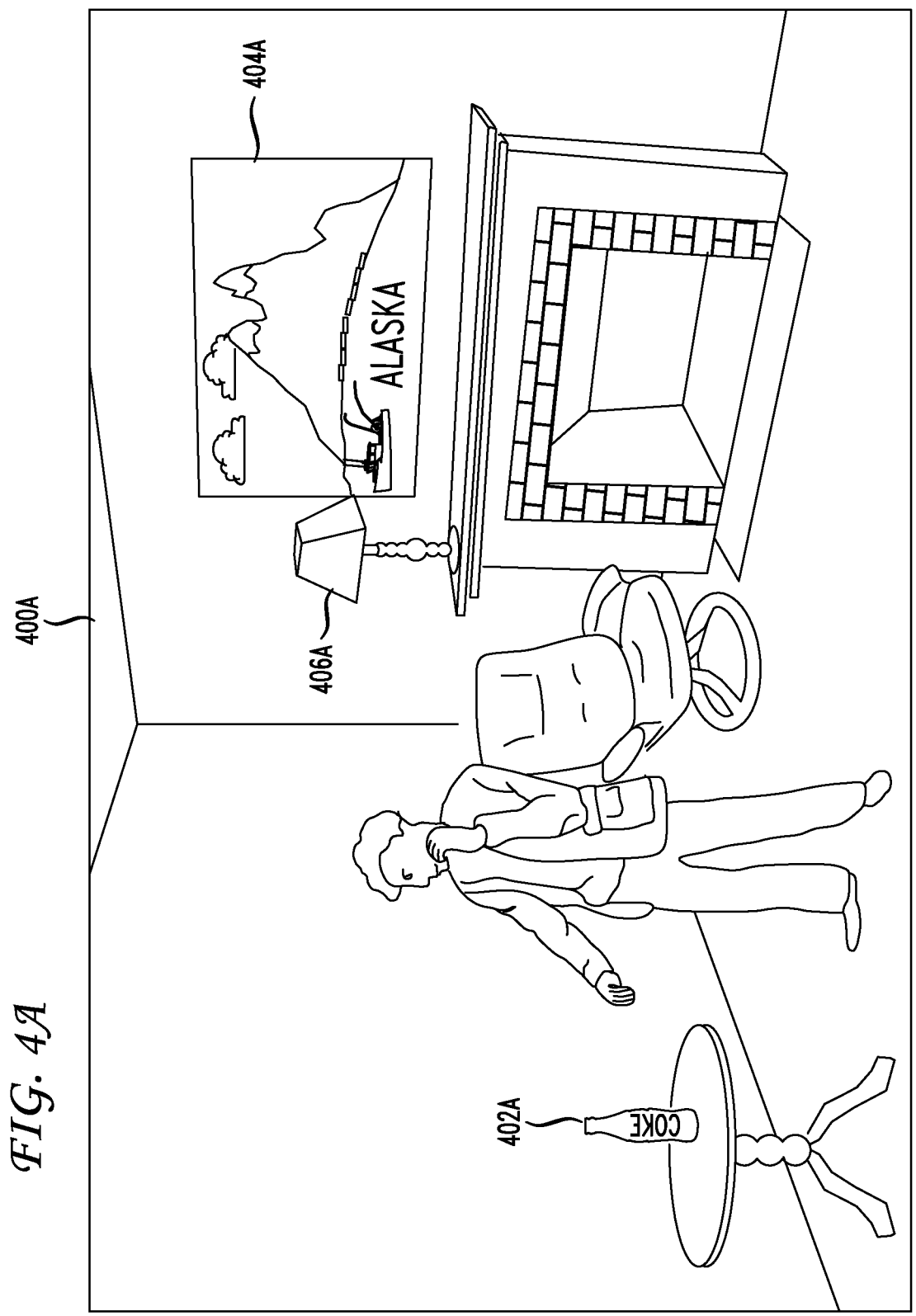
FIG. 4A illustrates a first unmodified television scene.

FIG. 4A illustrates an unmodified television scene 400A. In this scene, a coke bottle 402A is shown on the table, a picture of Alaska 404A is on the wall, and a certain type of lamp 406A is on the mantle. FIG. 4B illustrates the same television scene modified with dynamic personalized contextual advertisements 400B. The system modified this scene based on user preferences, available advertising components, etc. A root beer can 402B replaces the coke bottle 402A on the table. A promotional poster for Ireland 404B replaces the picture of Alaska 404A. An IKEA brand lamp 406B replaces the original lamp 406A. The replacement advertising component does not need to exactly match the size and shape of the replaced video segment, as the can does not exactly match a bottle and as the lamps do not exactly match each other. In some cases, the system must skew a flat image file, such as an image of the Ireland poster 404B, to fit the angle and orientation of the replaced segment. In some cases, the system generates background texture or information to account for differences between the replaced segment and the advertising component. Each advertising component contains text in this example, but text is not a requirement.

Figure 5B:
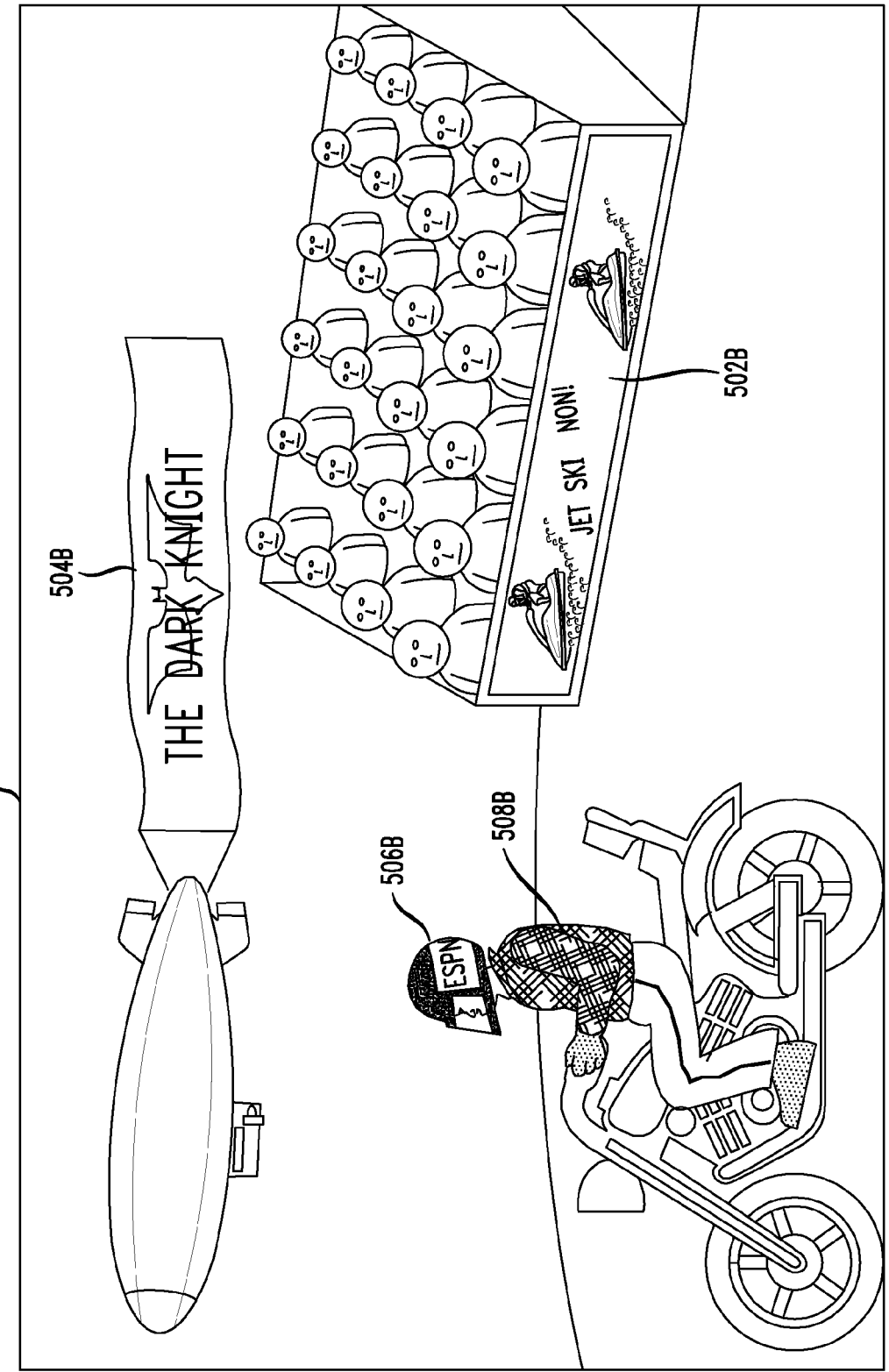
FIG. 5B illustrates the same video game including personalized contextual advertisements.

FIG. 5A illustrates an unmodified video game prepared for use with dynamically constructed personalized contextual advertisements. As video game consoles increase in complexity, all or part of the system can be incorporated into consoles. Video games can also encompass computer games. Due to the traditional polygonal nature of video game output, the system can require that advertisers provide advertising components in polygon form for use with video games or in a form easily convertible to polygons. The scene 500A depicts bleachers 502A containing an audience, a banner 504A pulled by a blimp, and a player wearing a helmet 506A and a jacket 508A. FIG. 5B illustrates the same video game including personalized contextual advertisements. Developers of the video game left each of these segments in the video game blank intentionally for the purpose of dynamically inserting personalized contextual advertisements in-game. As a user plays the game, the system identifies advertising components that match the user's profile and inserts them in appropriate places and times. The advertising components can be stored on the video game console or the system can retrieve them from a remote location, such as a server on the Internet. The system can replace all or part of the blank segments, although for illustration purposes, all of the blank segments are filled in for FIG. 5B.

FIG. 5B depicts a scene 500B where the system has replaced blank segments with personalized contextual advertisements. The system selects each advertisement based on a user profile. The system can also take in to account other factors to influence the type of advertising components to insert, such as the type of video game, the time of day, or current events/products. The system places an advertisement for Jet Skis on the bleachers 502B. The system applies three-dimensional transformations on the advertising component (an image) to insert over the blank area 502A. The system can insert an image in a distorted manner as well. For example, the system alters the movie advertisement for The Dark Knight 504B on the banner so that it tracks the movement and waving of the banner for a realistic look in-game. Another example is wrapping the ESPN logo 506B around the rear side of the user's helmet. The system transforms the logo to a semi-circular form to wrap neatly around the helmet rather than placing a flat image on a curved helmet. When players race in the video game simultaneously, each user sees helmet backs of other players who are in the lead. While one player sees ESPN on the back of the leader's helmet, other players can see entirely different dynamic, personalized advertising components tailored to his or her individual profile. The system changes the color of polygons making up the helmet to match ESPN's desired color, red, or other colors depending on the selected advertising component. As another example of what can constitute an advertising component, the system changes the racer's jacket from smooth to flannel texture 508B. Advertising components include textures and other more abstract elements. For example, a clothing manufacturer who markets a distinctly textured article of clothing may want to feature that distinct texture in a video program or in a video game without knowing in advance what forms or shapes are possible. The system can replicate, extrapolate, synthesize, or tile a particular texture over a given segment.

When an object is replaced with a differently shaped object, the original user interactions with the object may appear unnatural or unusual. For example, drinking from a 64 ounce Coca-Cola cup from a convenience store is a different motion than opening and drinking from a glass Coca-Cola bottle. The system can adjust user and inter-object interactions with an inserted video component to match the changes associated with the inserted video component. Such adjustments can include changing angles, distances, motions, placements, reactions, sizes, etc. of existing objects and/or persons. In some cases the system may remove other objects entirely or create new objects, such as a book to prop up an inserted object that is shorter than the original object it replaces.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to nearly any video display. Those skilled in the art will readily recognize various modifications and changes that may be made to the present invention without following the example embodiments and applications illustrated and described herein, and without departing from the true spirit and scope of the present invention.

We claim:

1. A method comprising:
   identifying a segment comprising multiple frames of a video program, the segment being susceptible to inserting a video component, wherein the video program is a non-dynamic video presentation of a non-virtual environment, and wherein the segment is identified using viewer preferences, video metadata from the video program, and component metadata from the video component;
   identifying a replacement background for the video component to replace a video program background associated with the segment;
   determining a price to insert the video component into the segment, wherein the price is based on:
      a segment prominence of the segment in the video program, independent of the video component; and
      a component prominence of the video component; and
   when the price is above a threshold, transmitting the video component and a set of instructions to a playback device, the set of instructions detailing how to insert the video component and the replacement background into the segment.

2. The method of claim 1, wherein the video component comprises one of a two-dimensional image, a video clip, a logo, a vector illustration, a three-dimensional model, a color, a character, a texture, and text.

3. The method of claim 1, wherein the video metadata is extracted in real time.

4. The method of claim 1, wherein the viewer preferences are extracted from a viewer profile comprising demographic information and a log of user behavior.

5. The method of claim 1, wherein the video program and the video component are combined before transmitting the video component and the set of instructions to the playback device.

6. The method of claim 1, wherein the video component is associated with a highest-paying advertiser.

7. The method of claim 1, wherein the video component and the set of instructions are stored as a construction list for future use.

8. The method of claim 1, wherein an advertiser establishes guidelines governing the threshold, usage, and placement of the video component.

9. The method of claim 1, further comprising:
   receiving feedback based on behavior of a viewer; and
   generating a behavior model for the viewer based on the feedback.

10. A system comprising:
    a processor; and
    a computer-readable storage medium having instructions stored which, when executed by the processor, cause the processor to perform operations comprising:
       identifying a segment comprising multiple frames of a video program, the segment being susceptible to inserting a video component, wherein the video program is a non-dynamic video presentation of a non-virtual environment, and wherein the segment is identified using viewer preferences, video metadata from the video program, and component metadata from the video component;

identifying a replacement background for the video component to replace a video program background associated with the segment;

determining a price to insert the video component into the segment, wherein the price is based on:
- a segment prominence of the segment in the video program, independent of the video component; and
- a component prominence of the video component; and when the price is above a threshold, transmitting the video component and a set of instructions to a playback device, the set of instructions detailing how to insert the video component and the replacement background into the segment.

11. The system of claim 10, wherein the video component comprises one of a two-dimensional image, a video clip, a logo, a vector illustration, a three-dimensional model, a color, a character, a texture, and text.

12. The system of claim 10, wherein the viewer preferences are extracted from a viewer profile comprising demographic information and a log of user behavior.

13. The system of claim 10, wherein the video component and the set of instructions are stored as a construction list for future use.

14. The system of claim 10, the computer-readable storage medium having additional instructions stored which result in the operations further comprising:
receiving feedback based on behavior of a viewer; and
generating a behavior model for the viewer based on the feedback.

15. A computer-readable storage device storing instructions which, when executed by a computing device, cause the computing device to perform operations comprising:
identifying a segment comprising multiple frames of a video program, the segment being susceptible to inserting a video component, wherein the video program is a non-dynamic video presentation of a non-virtual environment, and wherein the segment is identified using viewer preferences, video metadata from the video program, and component metadata from the video component;

identifying a replacement background for the video component to replace a video program background associated with the segment;

determining a price to insert the video component into the segment, wherein the price is based on:
a segment prominence of the segment in the video program, independent of the video component; and
a component prominence of the video component; and when the price is above a threshold, transmitting the video component and a set of instructions to a playback device, the set of instructions detailing how to insert the video component and the replacement background into the segment.

16. The computer-readable storage device of claim 15, wherein the viewer preferences are extracted from a viewer profile comprising demographic information and a log of user behavior.

17. The computer-readable storage device of claim 15, wherein the video component and the set of instructions are stored as a construction list for future use.

18. The computer-readable storage device of claim 15, the computer-readable storage device having additional instructions stored which result in the operations further comprising:
receiving feedback based on behavior of a viewer; and
generating a behavior model for the viewer based on the feedback.

* * * * *